(12) United States Patent
Szurkowski

(10) Patent No.: US 6,417,933 B1
(45) Date of Patent: Jul. 9, 2002

(54) TELECONFERENCING AND FACSIMILE COMMUNICATIONS SYSTEM AND METHOD

(75) Inventor: Edward Stanley Szurkowski, Maplewood, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 6 days.

(21) Appl. No.: 08/773,996

(22) Filed: Dec. 26, 1996

(51) Int. Cl.[7] .................................................. H04N 1/32
(52) U.S. Cl. ........................ 358/442; 358/402; 358/407; 379/100.01; 379/100.12
(58) Field of Search ................................ 358/402, 407, 358/432, 442, 400, 403; 379/93.23, 93.24, 100.01, 100.12, 100.06, 100.08, 131, 158, 164, 202, 205

(56) References Cited

U.S. PATENT DOCUMENTS

| | | | |
|---|---|---|---|
| 4,475,189 A | | 10/1984 | Herr et al. |
| 4,688,108 A | | 8/1987 | Cotton et al. ................ 358/400 |
| 4,722,082 A | * | 1/1988 | Furuya et al. ............... 370/463 |
| 4,878,242 A | * | 10/1989 | Springer et al. ............. 379/204 |
| 5,559,611 A | * | 9/1996 | Bloomfield et al. ........ 358/407 |
| 5,713,019 A | * | 1/1998 | Keaten ........................ 395/610 |
| 5,754,636 A | * | 5/1998 | Bayless et al. .............. 379/142 |
| 5,790,178 A | * | 8/1998 | Shibata et al. ............... 348/15 |
| 5,790,637 A | | 8/1998 | Johnson et al. |
| 5,835,577 A | * | 11/1998 | Disanto et al. ............. 379/93.19 |
| 5,854,893 A | * | 12/1998 | Ludwig et al. ............. 395/200.34 |
| 6,020,915 A | | 2/2000 | Bruno et al. |
| 6,148,066 A | * | 11/2000 | DiSanto ...................... 379/93.19 |

FOREIGN PATENT DOCUMENTS

| | | |
|---|---|---|
| JP | 8-317367 | 11/1996 |
| WO | 0 254 591 A2 | 1/1988 |
| WO | WO 91/03115 | 3/1991 |
| WO | WO 98/23058 | 5/1998 |

OTHER PUBLICATIONS

"MultiLink @ Telecon XVI" Brochure, MultiLink, Inc., 1995.
"QuickTalk Audio Conferencing System" brochure, Autel, Inc., 1996.
"MeetingPlace" brochure, Latitude Communications, 1996.*

* cited by examiner

Primary Examiner—Mark Wallerson
(74) Attorney, Agent, or Firm—Ryan, Mason & Lewis, LLP

(57) ABSTRACT

In a communications system for conducting a teleconference, a voice bridge is employed to establish communication connections with attendees of the teleconference. In addition, a facsimile bridge is employed to distribute facsimile data associated with the teleconference. In an illustrative embodiment, the attendees provide, through the communication connections, their facsimile numbers which may be used by the facsimile bridge to distribute the facsimile data to those attendees. Alternatively, through the communication connections, the voice bridge provides the attendees with an access number for retrieving the facsimile data from the facsimile bridge.

58 Claims, 4 Drawing Sheets

FIG. 2

| | | | CONFERENCE ACCESS CODE | | | | | |
|---|---|---|---|---|---|---|---|---|
| ATTENDEE # | SECURITY CODE | NAME | OFFICE PHONE NO. | OFFICE FACSIMILE NO. | EMAIL ADDRESS | MAILING ADDRESS | CHECK-IN TIME | CHECK-OUT TIME |
| 1 | 1465 | JOE | 111-234-5678 | 111-222-3333 | JOE@LUCENT.COM | ADDRESS 1 | NULL | NULL |
| 2 | 2347 | MARY | 222-345-6789 | 222-333-4444 | MARY@LUCENT.COM | ADDRESS 2 | NULL | NULL |
| ... | ... | ... | ... | ... | ... | ... | ... | ... |
| N | 2469 | ALEX | 999-123-4567 | 999-000-1111 | ALEX@YIP.COM | ADDRESS N | NULL | NULL |

201, 203

TELECONFERENCING AND FACSIMILE COMMUNICATIONS SYSTEM AND METHOD

FIELD OF THE INVENTION

The invention relates to communications systems and methods, and more particularly to systems and methods for conducting teleconferences involving facsimile communications.

BACKGROUND OF THE INVENTION

Teleconferencing including audioconferencing and videoconferencing has become a vital part of everyday business. With teleconferencing, a meeting where attendees from different locations participate through telephone connections can be scheduled and held in an efficient manner.

Similar to teleconferencing, facsimile communications allow remote parties to efficiently exchange information in the form of an image through telephone connections. Services based on facsimile communications have emerged and include, for example, facsimile distribution and facsimile mailbox services. In accordance with the facsimile distribution service, a predefined list of facsimile numbers of parties for whom facsimile information is intended is stored in a server. The latter broadcasts the facsimile information when it is ready according to the stored list. On the other hand, in accordance with the facsimile mailbox service, the facsimile information is first stored in a repository. A recipient afterwards can conveniently call a given number to retrieve the facsimile information from the repository.

The marriage of teleconferencing and facsimile communications has been observed. For example, in advance of a teleconference, meeting presentation materials and agendas are usually distributed to the attendees for their review. The distribution is typically by facsimile transmission using a list of the attendees' facsimile numbers provided earlier. To that end, the above facsimile distribution service may be employed.

SUMMARY OF THE INVENTION

The combination of the teleconferencing and facsimile communications techniques just described presents major benefits to business people including cutting down on their traveling costs and time, and increasing their productivity. However, during a teleconference, a need to transmit materials by facsimile to attendees often arises. This need may stem from that one or more of the attendees do not have the presentation materials in front of them even though the materials were facsimile-transmitted to them earlier, or the facsimile materials never reached them. It may also stem from that last minute changes in the presentation materials, or impromptu materials developed in the course of the teleconference need to be communicated to each attendee during the conference or shortly afterwards.

It would be a simple task to facsimile-transmit such materials if the facsimile numbers of the attendees remain the same as those in the list provided earlier, which are most likely their office facsimile numbers. This list may have been stored in the teleconferencing system conducting the teleconference, which is capable of facsimile transmission according to the stored list. However, taking advantage of the locational freedom afforded by teleconferencing, the attendees at the teleconference could be anywhere other than their offices, where they have access to telephone equipment. For example, they could be in a hotel room, traveling in a car, or working at home. Thus, the previous facsimile numbers are no longer valid for those attendees. In order to facsimile-transmit any materials in the teleconference, the facsimile originator oftentimes needs to find out the latest facsimile numbers of other attendees during the conference. At the same time, those attendees away from the office may scramble to locate a usable facsimile number, which may not be handy. The originator then collects the latest facsimile numbers, and finally makes the necessary changes to the original list of numbers before it is submitted for facsimile transmission. This practice proves to be disruptive to the conference, counterproductive, and at times unwieldy.

The invention overcomes the prior art limitations by closely tying the teleconferencing facility to the facsimile communications facility such that the facsimile communications during the teleconference are well coordinated. In accordance with the invention, when a communication connection with an attendee is established at the beginning of the teleconference, information regarding the attendee's facsimile equipment and his/her facsimile preferences is obtained through the same communication connection. In the preferred embodiment, a teleconferencing server is employed and comprises a voice bridge to which the communication connection is terminated. The voice bridge conveys the above attendee's facsimile information to a facsimile bridge in the server. The facsimile bridge then distributes facsimile data associated with the teleconference based on such information. In an alternative embodiment, through the same communication connection established between the attendee and the teleconferencing server in conducting the teleconference, the attendee is provided with information for retrieval of the facsimile data from a repository.

The invention affords advantages over a prior art teleconferencing system which enables an attendee to receive facsimile data on demand during a teleconference. Such a prior art system requires the attendee to use a communication connection other than the connection for the teleconference to communicate to the system the facsimile needs. As a result, the attendee has to either terminate the conference connection or locate another telephone to establish a separate connection to communicate such facsimile needs. In either event, in addition to the inconvenience imposed on the attendee, the attendee has to abandon the on-going teleconference, albeit temporarily, and may miss important information from the conference during his/her absence.

By contrast, with the invention, issues concerning facsimile needs are effectively resolved during the teleconference using the same communication connection for the conference, without interfering with the conference proceeding. As a result, the efficiency of the teleconference is much improved.

BRIEF DESCRIPTION OF THE DRAWING

Further objects, features and advantages of the invention will become apparent from the following detailed description taken in conjunction with the accompanying drawings of the preferred embodiment, in which:

FIG. 2 illustrates an attendance table used in the system of FIG. 1; and

DETAILED DESCRIPTION

Figure 1:
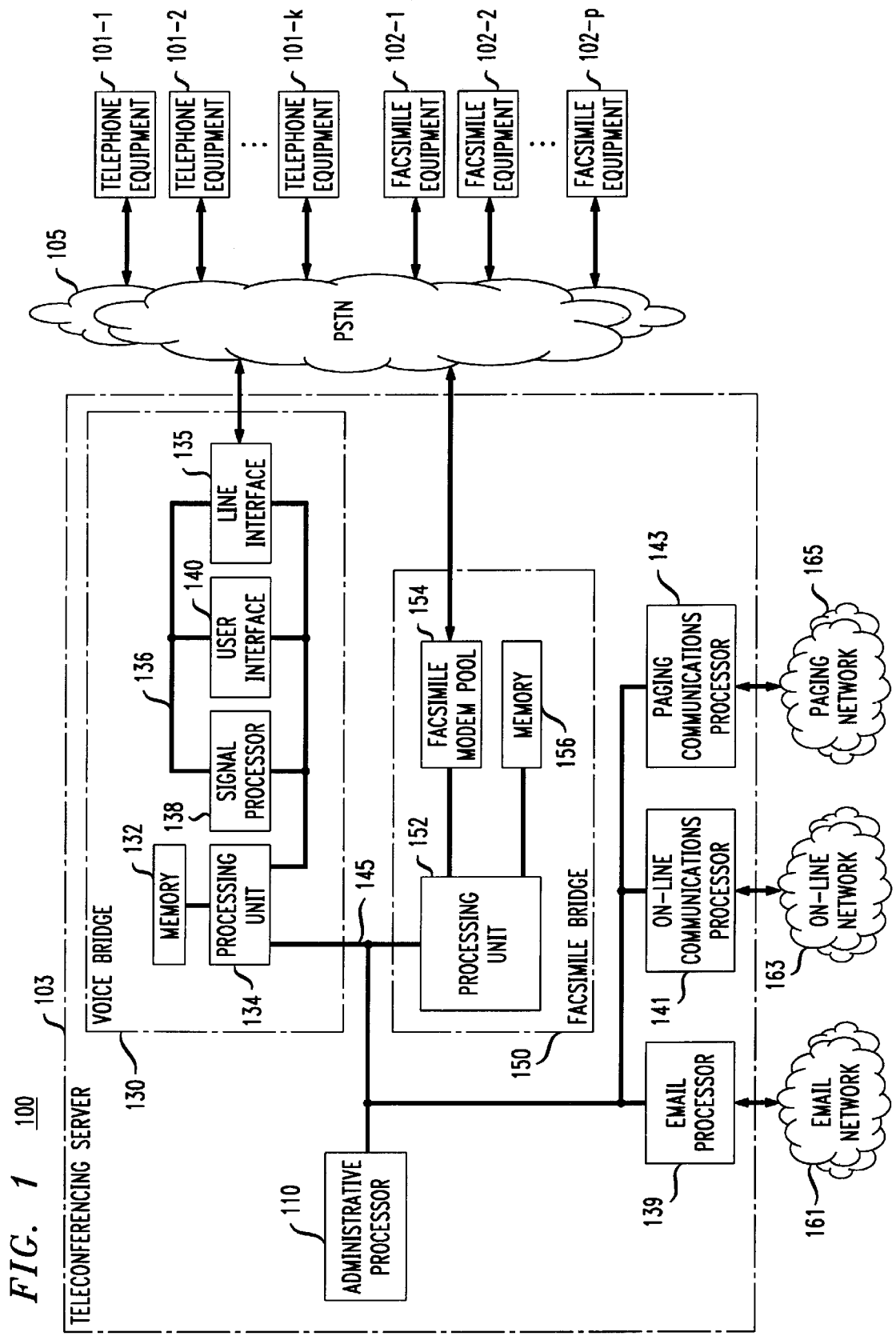
FIG. 1 illustrates a teleconferencing and facsimile communications system in accordance with the invention.

FIG. 1 illustrates communications system 100 embodying the principles of the invention for conducting teleconferences and handling facsimile communications associated therewith. In this particular illustrative embodiment, teleconference attendees utilize standard telephone equipment 101-1 through 101-k to hold a teleconference among themselves, where k is an integer greater than one. To that end, each attendee accesses teleconferencing server 103 through public switched telephone network (PSTN) 105 by calling a pre-assigned phone number associated with server 103. In addition, some, if not all, of the attendees have access to facsimile equipment, and their respective pieces of the equipment are denoted 102-1 through 102-p, where p is an integer. These pieces of facsimile equipment may also access server 103 through PSTN 105.

As shown in FIG. 1, teleconferencing server 103 comprises administrative processor 110, voice bridge 130, electronic mail (email) processor 139, on-line communications processor 141, paging communications processor 143 and facsimile bridge 150. Among other things, administrative processor 110 informs voice bridge 130 of teleconference schedules including the time for each teleconference, duration of the conference, number of access ports required in the conference, and a conference access code associated therewith. This information is stored in memory 132 of voice bridge 130.

Processor 110 also creates an attendance table for each teleconference, which is stored in memory 132. This attendance table is illustrated in FIG. 2. As shown in FIG. 2, the attendance table is identified by the conference access code and contains information about each of N attendees who were invited to participate in the conference, where N>1. For example, the names, office phone numbers, office facsimile numbers, email addresses, mailing addresses of the respective attendees are recorded in the table. Such attendee information, along with the conference scheduling information, is communicated by a conference organizer to processor 110 in setting up the teleconference. If server 103 is used for conducting a teleconference attended by members of a particular organization, and the organization has a database containing contact information for each organization member, it will be appreciated that processor 110 can access such a database to fill in the attendance table with the attendee information derived therefrom, as long as the attendees are identified by one of their attributes such as their office phone numbers.

In addition to the attendee information, the attendance table of FIG. 2 contains security codes which may be in the form of a personal identification number (PIN), and which were respectively assigned to the attendees. These security codes are used by the attendees to identify themselves as legitimate conference participants when they check in the teleconference on the scheduled date. Moreover, in this particular illustrative embodiment, each security code includes information indicating a security clearance level. The higher the clearance level, the more sensitive materials relating to the teleconference the corresponding attendee can obtain. For example, the first digit of each security code may indicate such a level, and the higher the value of the digit, the higher the clearance level the corresponding attendee has. Thus, referring to rows 201 and 202 in this example, attendee "Mary" has a higher clearance level ("2") than attendee "Joe" ("1").

As further shown in FIG. 2, the memory space for storing times of checking in and out of the teleconference for each attendee is reserved. The default values of the respective times are "NULL". These default values will be replaced by the actual check-in and check-out times of the attendees at the teleconference.

Other functions of administrative processor 110 include handling billing, running reports on the server activity for capacity planning, and performing diagnostics on various components of server 103.

Voice bridge 130 in FIG. 1 comprises, inter alia, line interface 135 where, in this example, one or more T1 lines terminate. In a well-known manner, each T1 line comprises 24 DS0 channels pursuant to a D4 channel format. Each DS0 channel contains a voice signal originating from one of telephone equipment 101-1 through 101-k. The signal in each voice channel is sent on to time division multiple access (TDMA) bus 136. Under the control of processing unit 134, signal processor 138 processes the voice signals from bus 136. Among other things, processor 138 in a standard way sums the values of the respective voice signals from the attendees' telephone equipment, and adjusts the gain of the additive signal. A copy of the resultant signal is transmitted back to each attendee's telephone equipment through a respective DS0 channel, thereby realizing the teleconference.

Email processor 139 is connected to email network 161, which may be the Internet, PSTN, or a private or public wired or wireless network. Email processor 139 is capable of receiving email messages, parsing contents of the messages in a predefined format to find special commands, and communicating with other components of teleconferencing server 103 to effect any such commands. Processor 139 is also capable of generating and transmitting status messages back to the email originator as a result of processing these commands or in response to events occasioned by other components in server 103. Email processor 139 is further capable of separating attached files from incoming email messages, feeding these files to such a software application as to convert their contents into facsimile images, and storing the converted files in memory 156 in facsimile bridge 150 for distribution. Conversely, email processor 139 can distribute the facsimile images stored in memory 156 by formatting these images into an appropriate file, attachable to or forming part of an email message directed to an attendee.

On-line communications processor 141 is connected to on-line network 163 which may be the Internet or a private or public data network. Processor 141 enables an attendee to communicate with server 103 in real time through network 163 using a standard personal computer (PC) or terminal with a modem. For example, with an appropriate browser interface or software on the PC, or standard command line inputs to the terminal, an attendee can interact with server 103. Specifically, the on-line attendee can enter commands and query status regarding facsimile distribution from server 103. Moreover, in a well-known manner, processor 141 is capable of converting facsimile images for screen display. Thus, the on-line attendee can also receive facsimile images stored in memory 156 through processor 141 on to his/her PC or terminal screen.

Paging communications processor 143 is connected to paging network 165. With processor 143, server 103 can communicate messages to attendees' pagers regarding statuses of facsimile transmission. One such status may indicate an availability of facsimiles to be distributed. With a two-way pager, an attendee who chooses not to participate in the teleconference can transmit commands to processor 143 through network 165, which enable the attendee to exercise certain controls over, say, the disposition of facsimile materials submitted during the teleconference. For example, upon obtaining on the pager the status message that facsimile data is ready to be distributed to the attendee, the attendee may respond using the pager to request server 103 to delay or redirect the distribution.

In accordance with the invention, facsimile bridge 150, in cooperation with voice bridge 130, electronic mail processor 139, on-line communications processor 141 and paging communications processor 143, accommodates the facsimile needs arising from the teleconference. To that end, processing unit 152 in facsimile bridge 150 is connected to processing unit 134 via link 145. One or more pieces of facsimile equipment 102-1 through 102-p may initiate connections with facsimile modem pool 154, and vice versa. Under the control of unit 152, facsimile modem pool 154 transmits and receives facsimile data through such connections. The facsimile data is stored in memory 156.

The facsimile needs arising from a teleconference are familiar. For example, before a teleconference, presentation materials relating to the teleconference need to be facsimile-transmitted to each attendee. To that end, a facsimile submission number associated with facsimile bridge 150 is given to each attendee. Any attendee having materials to be presented in the teleconference is required to facsimile-transmit such materials to facsimile bridge 150 using the submission number before a deadline prior to the conference. The presentation materials are then stored in memory 156. Using the office facsimile numbers in the attendance table of FIG. 2, processing unit 152 causes a copy of the presentation materials to be facsimile-transmitted to the attendees through facsimile modem pool 154 shortly after the deadline, so that the attendees have ample time to review the materials in advance of the teleconference.

In addition to the pre-conference facsimile needs, during a teleconference, presentation materials again need to be facsimile-transmitted to some of the attendees who do not have the materials in front of them even though the materials were transmitted to them earlier. New materials such as changes in the presentation materials and last minute materials need to be transmitted to the attendees at the beginning of the conference. These new materials have been received by facsimile bridge 150 after the above deadline but before the beginning of the conference, and are recognized by processing unit 152 as such. Impromptu materials developed in the course of the teleconference may also need to be transmitted during the conference.

Traditionally, in handling the facsimile needs during a teleconference, the facsimile originator typically asks the other attendees at the conference for their latest facsimile numbers. This stems from that the previous facsimile numbers used for distributing materials in advance of the conference, which are most likely the attendees' office facsimile numbers, may no longer be valid. As of the time of the conference, the attendees could be anywhere other than their offices, where they have access to telephone equipment. For example, they could be in a hotel room, traveling in a car, or working at home. While the originator is collecting the facsimile numbers, those attendees away from the office may be scrambling to locate a usable facsimile number, which may not be handy. After the numbers are finally collected, the originator then makes the necessary changes to the original list of numbers before it is submitted for facsimile transmission. This practice proves to be disruptive to the conference, counterproductive and at times unwieldy.

Figure 3A:
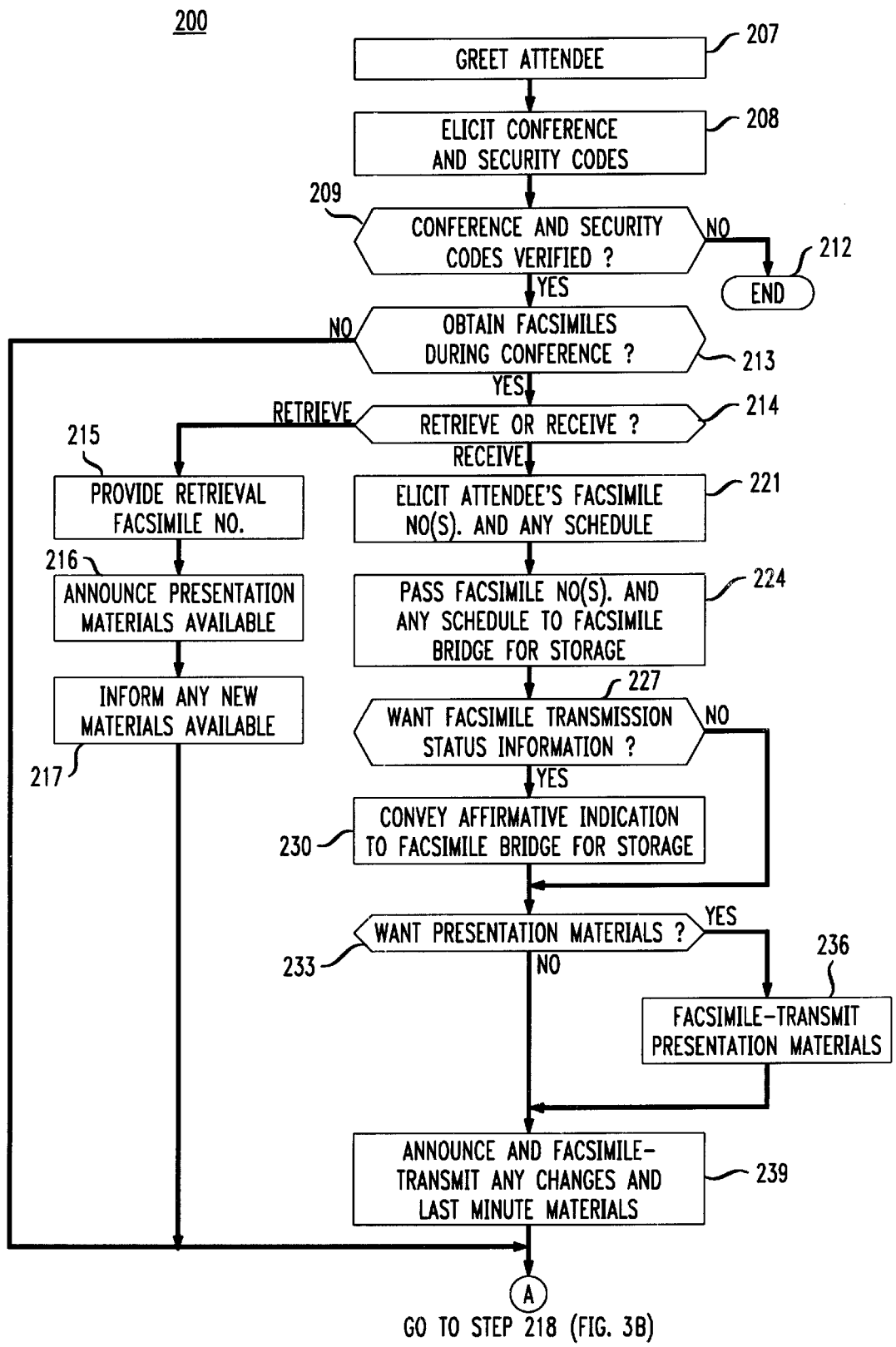
FIGS. 3A and 3B jointly illustrate a flow chart depicting the steps of an initialization routine performed in the system of FIG. 1.
Figure 3B:
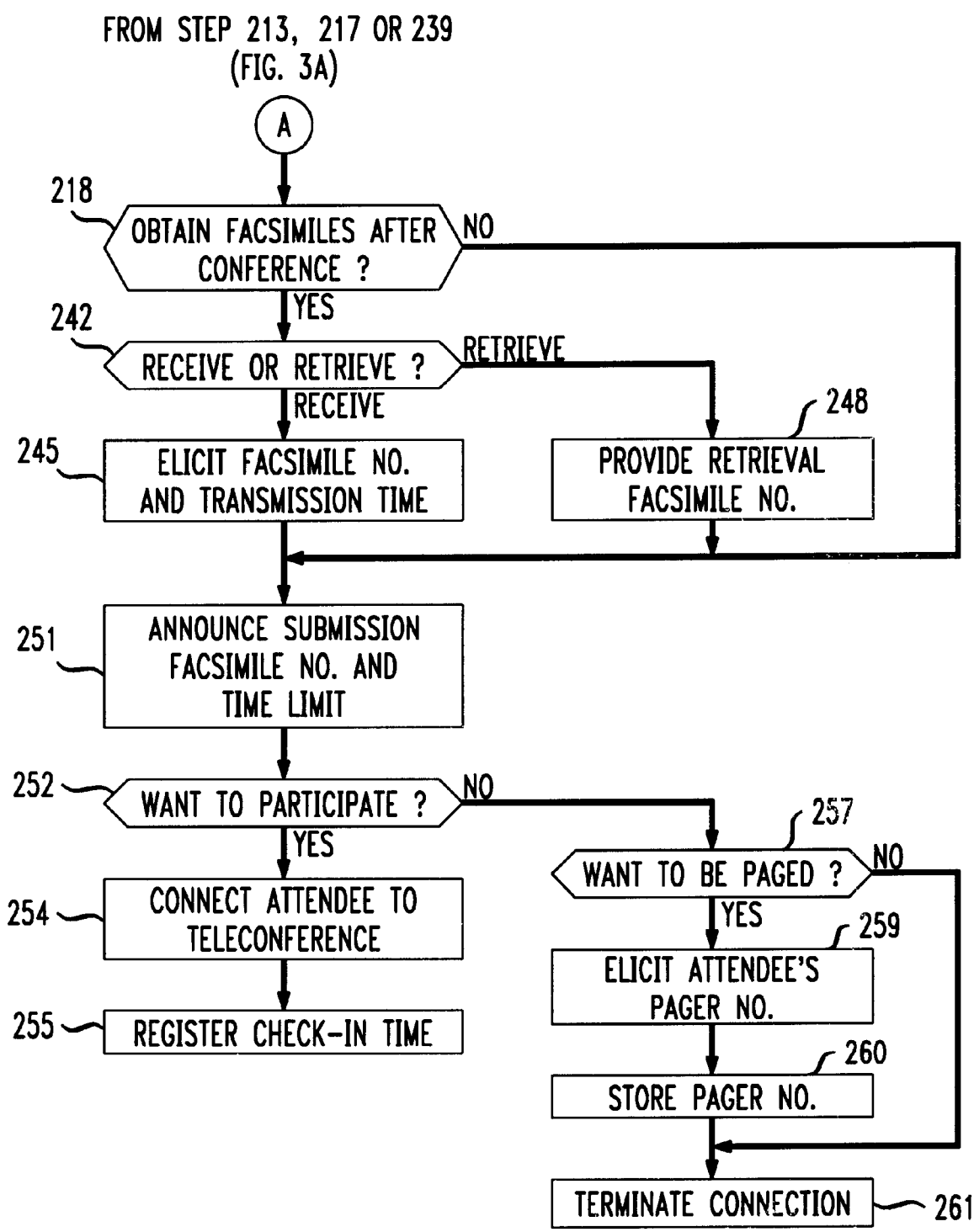

In accordance with the invention, the teleconferencing facility is intimately tied to the facsimile communications facility. Specifically, initialization routine 200 in FIGS. 3A and 3B, which is stored in memory 132, is used to elicit attendees' facsimile information as they are connected to the teleconference. When an attendee calls server 103 at a pre-assigned number, instructed by routine 200, processing unit 134 at step 207 greets the attendee through user interface 140. The greeting may be "Welcome to the teleconferencing service provided by XYZ Company". This greeting is pre-recorded or is generated using a conventional text-to-speech device (not shown) and stored in memory 132. It should be noted that other announcements such as status updates and alerts may also be pre-recorded and stored in memory 132, or may be generated on-the-fly by the text-to-speech device. These other announcements are accordingly communicated to the attendee through interface 140 during the teleconference. Unit 134 then elicits from the attendee-the requisite conference access code and security code given to him/her earlier, as indicated at step 208.

The conference access code identifies a particular teleconference, verification of which ensures that the attendee has called for the correct, scheduled conference. The security code identifies the attendee, verification of which ensures that he/she is a legitimate participant. The attendee enters the conference access code and security code by pressing the corresponding numerical keys on his/her touch-tone telephone equipment. User interface 140 recognizes DTMF tones thus generated by the equipment. In the event that the attendee uses a rotary telephone equipment, interface 140 also incorporates a standard algorithm for "spotting" words in a phone conversation. That is, through the algorithm, interface 140 recognizes selected control words verbally communicated by the attendee via the phone receiver. In this instance, interface 140 recognizes the numerals constituting the conference access code and security code uttered by the attendee.

After the conference access code and security code are received by interface 140, unit 134 verifies the code entries, as indicated at step 209. If either code entry is not verified, routine 200 proceeds to step 212 where unit 134 in a standard way terminates the call. Otherwise if both code entries are valid, routine 200 proceeds to step 213 where unit 134 inquires the attendee whether he/she wants to obtain facsimiles during the teleconference. If the attendee does not want to obtain any facsimile during the conference, which may be indicated to unit 134 by pressing a first predetermined touch-tone key or by uttering a predetermined negative response, routine 200 advances to step 218 in FIG. 3B to be described. Otherwise if the attendee wants to obtain facsimiles during the conference, which may be indicated to unit 134 by pressing a second predetermined key or by uttering a predetermined affirmative response, routine 200 proceeds to step 214. Unit 134 at step 214 inquires whether the attendee wants to retrieve or receive the facsimiles during the teleconference.

Under certain circumstances, the attendee may not want to receive any facsimile during the conference. For example, the attendee is on a mobile phone having only one line and cannot accept facsimiles while he/she is using the line for the teleconference, or the attendee (e.g., working at home) simply has no access to facsimile equipment during the conference. Thus, under such circumstances, the attendee chooses to retrieve the facsimiles on his/her own. If that is the case, unit 134 provides the attendee with a retrieval facsimile number associated with facsimile bridge 150 and any necessary extension, as indicated at step 215. Unit 134 at step 216 then announces that presentation materials are available for retrieval at a first facsimile mailbox associated with a first extension of the retrieval facsimile number. Unit 134 at step 217 further informs the attendee of whether any new materials are available for retrieval at a second mailbox associated with a second extension of the number. Through unit 152, unit 134 knows whether there are any new materials, e.g., changes in the presentation materials and last minute materials, recently deposited in memory 156 for retrieval. Routine 200 proceeds from step 217 to step 218 in FIG. 3B to be described.

Otherwise if the attendee at step 214 wants to receive facsimiles during the teleconference, unit 134 at step 221 elicits from the attendee one or more facsimile numbers, and a schedule for that purpose. The attendee can give more than one facsimile numbers in case that any one of them may be busy at the time of the facsimile transmission. In addition, the attendee may partition the conference by time, and specify one or more facsimile numbers usable during each time interval. The last feature is particularly advantageous to a traveling attendee moving from place to place. For example, the traveling attendee is calling from a car, knowing that he/she is making a few stops where he/she has access to facsimile equipment. Using the above feature, the attendee can direct the facsimile transmissions to the appropriate equipment according to the travel plan.

After receiving the facsimile numbers and the corresponding schedule from the attendee, unit 134 at step 224 passes the information on to facsimile bridge 150 via link 145. This information is stored in a database created for the attendee in memory 156. Routine 200 then proceeds to step 227 where unit 134 inquires whether the attendee wants any facsimile transmission status information to be communicated to him/her during the teleconference.

When a facsimile is transmitted using facsimile bridge 150 during the teleconference, processing unit 152 is informed by modem pool 154 as to the status of the facsimile transmission. The status information may indicate conditions with the communications, e.g., unresponsiveness of the called facsimile equipment. It may also indicate conditions within the equipment, e.g., an out-of-paper condition, pursuant to the standard facsimile protocol used. In accordance with an aspect of the invention, the attendee may choose to receive such status information when a facsimile is transmitted to him/her during the teleconference. In response to this information, the attendee can make any necessary adjustment to the facsimile equipment. To that end, the status information is conveyed from processing unit 152 to processing unit 134 via link 145. Unit 134 retrieves from memory 132 a pre-recorded announcement corresponding to the received status information. Unit 134 then inserts the announcement into the voice channel associated with the attendee through signal processor 138. Thus, in addition to hearing the conversations of other attendees during the teleconference, the attendee is able to hear the facsimile status announcement specifically directed to him/her.

In any event, if at step 227 the attendee chooses not to receive any facsimile transmission status information, routine 200 proceeds to step 233 to be described. However, in accordance with another aspect of the invention, during the teleconference an attendee can always inquire about other statuses such as availability of any queued facsimiles to be distributed to him/her. To that end, the attendee can enter via telephone equipment a DTMF command sequence corresponding to the status inquiry, followed by his/her security code identifying himself/herself. The DTMF command sequence and the security code, when received by voice bridge 130 would not be inserted by signal processor 138 into the additive signal broadcast to the attendees. This being so, such an inquiry would not present a disruption to the on-going teleconference. Similarly, taking advantage of the word spotting capability of user interface 140, the attendee can also make the inquiry by uttering specified control words into the receiver of the telephone equipment, which are not normally used in a conference. Again, such control words would not be broadcast to the attendees. As an alternative to using telephone equipment, an attendee may use a terminal (not shown) to access on-line communications processor 141 to make the same inquiry.

Otherwise if at step 227 the attendee chooses to receive any facsimile transmission status information, unit 134 conveys an affirmative indication to facsimile bridge 150 where such an indication is stored in the attendee's database in memory 156, as indicated at step 230. Routine 200 thence proceeds to step 233. Unit 134 at step 233 inquires whether the attendee wants to receive conference presentation materials even though these materials were transmitted to him/her earlier. If the attendee responds affirmatively, unit 134 sends a control message to processing unit 152. Accordingly, unit 152 retrieves the presentation materials stored in memory 156, and causes the materials to be transmitted through facsimile modem pool 154 using the facsimile number just provided by the attendee, as indicated at step 236. Routine 200 then advances to step 239. If the attendee responds negatively at step 233, routine 200 skips step 236 and ends up at step 239 as well.

Again, through unit 152, unit 134 knows whether there are any new materials, e.g., changes in the presentation materials and last minute materials, recently deposited in memory 156. If such materials exist, unit 134 at step 239 announces to the attendee that the new materials are being facsimile-transmitted to the attendee. At the same time, unit 134 conveys a second control message to unit 152, effecting the facsimile transmission of the materials. Routine 200 thence proceeds to step 218 in FIG. 3B.

At step 218, unit 134 inquires whether the attendee wants to obtain facsimiles after the teleconference. If the attendee responds affirmatively, unit 134 at step 242 further inquires whether the attendee prefers to retrieve on his/her own the facsimile data from memory 156, or to receive the facsimile data at a time and a facsimile number specified by him/her. If the attendee chooses to receive the facsimile data, unit 134 elicits from the attendee the facsimile number and a transmission time for that purpose, as indicated at step 245. It should be noted that the specified transmission time should be within certain time limits. In particular, it is preferably after a predetermined delay from the end of the teleconference, allowing some time for the facsimile originator to organize the materials resulting from the teleconference for facsimile transmission.

If the attendee chooses to retrieve the facsimile data on his/her own, unit 134 provides the attendee with a retrieval facsimile number associated with facsimile bridge 150, as indicated at step 248. Similarly, it is preferable that the attendee is allowed to retrieve the facsimile data within certain time limits.

Routine 200 proceeds from either step 245 or step 248 to step 251 where unit 134 announces a submission facsimile number associated with facsimile bridge 150 for submitting any conference materials during the teleconference up to the predetermined delay from its end. This submission facsimile number may be the same as the previous number given to the attendees. Thus, using the submission facsimile number, any attendees can submit materials developed in the course of the teleconference by facsimile-transmitting them to facsimile bridge 150.

In accordance with another feature of the invention, at the time of submission the facsimile originator may specify to facsimile bridge 150 the minimum clearance level of the intended recipients of the submitted materials. For example, such a clearance level may be written at a predetermined location on a facsimile cover sheet. Upon receipt of the submitted materials, along with the cover sheet, unit 152 recognizes using a standard character recognition algorithm the written minimum clearance level associated therewith. Before facsimile-transmitting such materials to any attendee, unit 152 checks the attendance table of FIG. 2 for the clearance level of the attendee. Attendees with a clearance level lower than the minimum level are denied access to the materials.

It should be noted that unit 134 at step 251 may also give out an email address associated with email processor 139 for submission of materials during the teleconference. Thus, instead of facsimile-transmitting the materials to facsimile bridge 150, an attendee could send an email message to processor 139 with the submitted materials forming part of or an attached file to the message. Upon receipt of the email message, email processor 139 in a standard way converts the materials to facsimile images for distribution.

In any event, the submitted facsimile materials are first stored in memory 156. Processing unit 152 then distributes the materials in accordance with individual attendees' databases reflecting their facsimile preferences. If at step 218 the attendee chooses not to obtain any facsimiles after the teleconference, routine 200 ends up at step 251 as well. In any event, routine 200 proceeds from step 251 to step 252 where unit 134 inquires whether the attendee wants to participate in the teleconference. If the response is affirmative, unit 134 connects the attendee to the teleconference, as indicated at step 254. Unit 134 then registers at step 255 the check-in time of the attendee in the attendance table of FIG. 2.

Otherwise if the attendee chooses not to participate in the teleconference at step 252, routine 200 proceeds to step 257. Unit 134 at step 257 inquires whether the attendee wants to be paged when materials developed in the course of the teleconference are available for distribution. Thus, although absent from the conference, the attendee can still be informed of any such distribution, and can then pick up the materials at designated facsimile equipment, or retrieve same from server 103.

If the attendee chooses not to be paged, the communication connection between voice bridge 130 and the attendee's telephone equipment would be terminated, as indicated at step 261. Otherwise if the attendee chooses to be paged, routine 200 proceeds to step 259 where unit 134 elicits from the attendee his/her pager number usable during the teleconference, along with the pager PIN. These pager number and PIN are then stored in the attendee's database in memory 156, as indicated at step 260. Routine 200 then proceeds to step 261 described before.

In this illustrative embodiment, an initialization process similar to routine 200 is alternatively available for an attendee to complete using an on-line terminal. Unlike routine 200 which is voice interactive, the on-line initialization process is menu driven. As another alternative, an attendee may complete the initialization process by sending processor 139 an email message containing necessary information in a predefined format. In either event, after the initialization process is complete, if the attendee wants to participate in the teleconference, the attendee can call voice bridge 130 at the pre-assigned number. The attendee then only needs to enter the conference access code and security code to join the conference in accordance with routine 200, bypassing the rest of the routine.

During the teleconference, an attendee may want to change the facsimile numbers and/or facsimile schedule previously communicated to voice bridge 130 as he/she may be relocated. Such changes can be realized by entering the corresponding DTMF command sequences on touch-tone telephone equipment. Taking advantage of the word spotting capability of user interface 140, the attendee can also achieve those changes by uttering specified control words into the receiver of the telephone equipment. Moreover, instead of using telephone equipment, the attendee can use an on-line terminal or rely on an email message to communicate to server 103 the above command and control information. In any event, in response to the attendee's initiation of changes, only part of routine 200 including steps 221, 224, 227, 230 and 233 (or its equivalent in the case of the on-line terminal) is reactivated. Accordingly, the attendee can make the desired changes through the shortened routine.

Similarly, if a facsimile number was not handy when the attendee was going through the initialization process at the beginning of the teleconference call, during the conference he/she can reactivate part of routine 200 to provide that information when it becomes available. Any new materials and materials developed up to that point of conference would be facsimile-transmitted to the attendee according to his/her new instructions.

During the teleconference, if the attendee wants to halt the transmission of facsimiles to him/her as the facsimile equipment perhaps needs to be made available for more urgent incoming materials, the attendee may enter a predetermined DTMF command sequence on the telephone equipment (or otherwise using an on-line terminal or by email message) to stop the transmission. In response, unit 152 causes the outstanding facsimiles to be queued in memory 156 for later transmission. As the facsimile equipment becomes available, the attendee can enter a second predetermined DTMF command sequence or otherwise to resume the facsimile transmission.

An attendee may leave the teleconference at any time by hanging up his/her telephone equipment. In that case, line interface 135 detects the disconnection and informs unit 134 of same. Unit 134 then registers the attendees check-out time in the attendance table of FIG. 2.

Before hanging up the call, the attendee may want to stop the facsimile transmission to him/her in a manner described before as he may no longer has access to the facsimile equipment. Unit 134 may also be programmed such that, upon a call disconnection, it automatically causes unit 152 to immediately stop transmitting any facsimiles to the disconnected attendee.

When the teleconference is over (i.e., every attendee has terminated the connection to voice bridge 130), a copy of an attendance log for the purpose of future communications between the attendees is facsimile-transmitted to each attendee who chooses to receive facsimiles. This log is also available for retrieval. The information on the attendance log is derived by unit 134 from the attendance table of FIG. 2. This information includes the names, office telephone numbers, office facsimile numbers, e-mail addresses of the attendees who were invited to participate in the teleconference, and the check-in and check-out times of those who actually participated.

The foregoing merely illustrates the principles of the invention. It will thus be appreciated that a person skilled in the art will be able to devise numerous communications systems which, although not explicitly shown or described herein, embody the principles of the invention and are thus within its spirit and scope.

For example, in the disclosed embodiment, server 103 illustratively distributes materials by facsimile. Alternatively, an attendee may direct server 103 to distribute some or all of such materials as attached files to an email message to the attendee.

Moreover, it will be appreciated that server 103 will have a printing facility whereby the facsimile materials can be realized in printed form. Under circumstances where the volume of the distributed materials is large and the cost of receiving such materials by facsimile is exorbitant, where no facsimile equipment is available, or where the quality of the available facsimile equipment is substandard, with such a printing facility, an attendee could then direct server 103 to print the materials and deliver them by an express courier to the mailing address of the attendee, which is incorporated in the attendance table of FIG. 2.

In addition, it will be appreciated that the materials submitted to facsimile bridge 150 for distribution may be made available by an on-line service via the Internet for example. An attendee may access a designated home page using an on-line terminal to view and/or retrieve the facsimile images. Such access may require a login ID and password.

Further, in the disclosed embodiment, status information on an availability of submitted materials for facsimile distribution is accessible by an attendee. It will be appreciated that such information will be followed by information such as the name of the submitter, number of pages, etc. Based on this additional information, the attendee will be able to efficiently dispose of the distribution. For example, the attendee will be able to request server 103 having the above printing facility to print and deliver some or all of the materials when the number of pages is large. The attendee will also be able to request server 103 to delay facsimile transmission of materials from certain submitters in favor of other submitters. Furthermore, such additional information can readily be formatted into a pager message which is transmitted, along with the choices of disposition of the facsimile materials selectable by a two-way pager. Based on this message, an attendee can use his/her two-way pager to select the desired disposition choice and communicate the selection to server 103.

Moreover, the teleconference described in the illustrative embodiment is an audioconference. However, the invention is generally applicable to any type of teleconference including a videoconference.

In addition, in the illustrative embodiment, the lines terminating on voice bridge 130 are. T1 lines. However, other standard lines such as E1 or analog tip-ring lines may also be used depending on the locality and cost considerations. E1 lines are available outside North America and analogous to T1 lines. Specifically, each E1 line supports 30 DSO channels as opposed to 24 DSO channels as in T1. Analog tip-ring lines may be desirable if only a few communications connections are required for the voice bridge as they cost less than the T1/E1 lines. Of course, for any kind of line that is selected for use, the line interface in the voice bridge should correspond to the selected line pursuant to the well-known telephony standards.

Further, in the illustrative embodiment, system 100 is designed based on a circuit switched technique. It will be appreciated that a person skilled in the art will design the system based on another technique such as a packet switched technique whereby, for example, the voice and facsimile information is communicated in packets.

Finally, although teleconferencing server 103, as disclosed, is embodied in the form of various discrete functional blocks, the server could equally well be embodied in an arrangement in which the functions of any one or more of those blocks or indeed, all of the functions thereof, are realized, for example, by one or more appropriately programmed processors or devices.

I claim:

1. Server apparatus for conducting a teleconference attended by a plurality of attendees comprising:

an interface for establishing a communication connection over a communication network with at least one attendee to conduct said teleconference;

a facsimile controller for distributing facsimile data associated with said teleconference; and a processor element for eliciting from the at least one attendee during at least a portion of the teleconference, through said communication connection, information concerning a manner in which said facsimile data is distributed to the at least one attendee, said information being conveyed to said facsimile controller, which subsequently distributes said facsimile data to the at least one attendee based on said information.

2. The apparatus of claim 1 wherein said teleconference includes an audioconference.

3. The apparatus of claim 2 wherein said communication connection includes a voice connection.

4. The apparatus of claim 1 wherein said information includes at least one destination to which said facsimile data is distributed.

5. The apparatus of claim 1 wherein said information includes a time of said distribution.

6. The apparatus of claim 1 wherein said information includes facsimile transmission preferences.

7. The apparatus of claim 6 wherein said preferences include whether status information regarding a distribution of said facsimile data should be provided.

8. The apparatus of claim 6 wherein said preferences include a suspension of said distribution during said teleconference based on a determination by the at least one attendee.

9. The apparatus of claim 8 wherein said preferences include resuming said distribution during said suspension.

10. The apparatus of claim 1 further comprising an email processor for acquiring information regarding facsimile transmission preferences via email.

11. The apparatus of claim 1 further comprising an on-line processor for acquiring information regarding facsimile transmission preferences via on-line communications.

12. The apparatus of claim 1 further comprising a paging processor for acquiring information regarding facsimile transmission preferences via paging communications.

13. The apparatus of claim 1 further comprising an email processor for distributing said facsimile data via email.

14. The apparatus of claim 1 further comprising an on-line processor for distributing said facsimile data via on-line communications.

15. The apparatus of claim 1 wherein said interface includes means for detecting a disconnection of said communication connection, and said processor element includes means for recording the time of said disconnection.

16. The apparatus of claim 1 wherein said information is only valid for a selected interval during said teleconference.

17. The apparatus of claim 1 wherein said facsimile data includes data indicative of a selected security level.

18. The apparatus of claim 17 wherein said facsimile controller includes means for checking a security level associated with the attendee with the selected security level before said facsimile data is distributed.

19. Server apparatus for conducting a teleconference attended by a plurality of attendees comprising:
- an interface for establishing a communication connection with at least one attendee to conduct said teleconference;
- a repository for storing facsimile data associated with the teleconference;
- a facsimile controller for identifying a change in the facsimile data stored in the repository; and
- a processor element responsive to the change for providing to the at least one attendee information concerning an identity of said facsimile data which has been changed through said communication connection, thereby allowing the at least one attendee to change a manner in which said facsimile data from said repository is distributed to the at least one attendee based on said information.

20. The apparatus of claim 19 including a facsimile bridge, said repository includes a memory in said facsimile bridge.

21. The apparatus of claim 19 wherein said teleconference includes an audioconference.

22. The apparatus of claim 21 wherein said communication connection includes a voice connection.

23. Server apparatus for conducting a teleconference attended by a plurality of attendees comprising:
- an interface for establishing a communication connection with at least one attendee to conduct said teleconference;
- a repository for storing facsimile data associated with the teleconference;
- a processor element for communicating to the at least one attendee through said communication connection information on submitting the facsimile data to said repository during at least a portion of the teleconference, a submission of the facsimile data including an identifier identifying a subset of the attendees; and
- a controller for distributing the facsimile data to the subset of the attendees based on the identifier.

24. The apparatus of claim 23 wherein said identifier is indicative of a security level.

25. The apparatus of claim 23 including a facsimile bridge, said repository includes a memory in said facsimile bridge.

26. The apparatus of claim 23 wherein said teleconference includes an audioconference.

27. The apparatus of claim 26 wherein said communication connection includes a voice connection.

28. A system for conducting a teleconference attended by a plurality of attendees comprising:
- a plurality of communication devices;
- an interface for establishing a communication connection over a communication network with at least one attendee using one of the communication devices to conduct said teleconference;
- a facsimile controller for distributing facsimile data associated with said teleconference; and
- a processor element for eliciting from the at least one attendee during at least a portion of the teleconference, through said communication connection, information concerning a manner in which said facsimile data is distributed to the at least one attendee, said information being conveyed to said facsimile controller, which subsequently distributes said facsimile data to the at least one attendee based on said information.

29. The system of claim 28 wherein said teleconference includes an audioconference.

30. The system of claim 29 wherein said communication connection includes a voice connection.

31. The system of claim 28 wherein each communication device includes telephone equipment.

32. The system of claim 28 wherein said facsimile controller is capable of providing status information regarding said distribution.

33. A method for conducting a teleconference attended by a plurality of attendees comprising the steps of:
- establishing a communication connection through a communication network with at least one attendee to conduct said teleconference;
- eliciting from the at least one attendee during at least a portion of the teleconference, through said communication connection, information concerning a manner in which facsimile data is distributed to the at least one attendee; and
- distributing said facsimile data to the at least one attendee based on said information.

34. The method of claim 33 wherein said teleconference includes an audioconference.

35. The method of claim 34 wherein said communication connection includes a voice connection.

36. The method of claim 33 wherein said information includes at least one destination to which said facsimile data is distributed.

37. The method of claim 33 wherein said information includes a time of said distribution.

38. The method of claim 33 wherein the information includes facsimile transmission preferences.

39. The method of claim 38 wherein said preferences include whether status information regarding a distribution of said facsimile data should be provided.

40. The method of claim 38 wherein said preferences include resuming said distribution during said suspension based on a determination by the at least one attendee.

41. The method of claim 40 wherein said preferences include resuming said distribution during said suspension.

42. The method of claim 33 further comprising the step of acquiring information regarding facsimile transmission preferences via email.

43. The method of claim 33 further comprising the step of acquiring information regarding facsimile transmission preferences via on-line communications.

44. The method of claim 33 further comprising the step of acquiring information regarding facsimile transmission preferences via paging communications.

45. The method of claim 33 wherein said facsimile data is distributed via email.

46. The method of claim 33 wherein said facsimile data is distributed via on-line communications.

47. The method of claim 33 further comprising the steps of detecting a disconnection of said communication connection, and recording the time of said disconnection.

48. The method of claim 33 wherein said information is only valid for a selected interval during said teleconference.

49. The method of claim 33 wherein said facsimile data includes data indicative of a selected security level.

50. The method of claim 49 further comprising the step of checking a security level associated with the attendee with the selected security level before said facsimile data is distributed.

51. A method for conducting a teleconference attended by a plurality of attendees comprising the steps of:
- establishing a communication connection with at least one attendee to conduct said teleconference;

storing facsimile data associated with the teleconference in a repository;

identifying a change in the facsimile data stored in the repository; and in response to the change, providing to the at least one attendee information concerning an identity of said facsimile data which has been changed through said communication connection, thereby allowing the at least one attendee to change a manner in which said facsimile data from said repository is distributed to the at least one attendee based on said information.

52. The method of claim 51 wherein said teleconference includes an audioconference.

53. The method of claim 52 wherein said communication connection includes a voice connection.

54. A method for conducting a teleconference attended by a plurality of attendees comprising the steps of:

establishing a communication connection with at least one attendee to conduct said teleconference;

receiving facsimile data associated with the teleconference in a repository;

communicating to the at least one attendee through said communication connection information on submitting the facsimile data to said repository during at least a portion of the teleconference, a submission of the facsimile data including an identifier identifying a subset of the attendees; and distributing the facsimile data to the subset of the attendees based on the identifier.

55. The method of claim 54 wherein said identifier is indicative of a security level.

56. The method of claim 54 wherein said information includes data identifying said repository.

57. The method of claim 54 wherein said teleconference includes an audioconference.

58. The method of claim 57 wherein said communication connection includes a voice connection.

* * * * *